US010472085B2

(12) United States Patent
Waigl et al.

(10) Patent No.: US 10,472,085 B2
(45) Date of Patent: Nov. 12, 2019

(54) DIFFERENTIAL PRESSURE SENSOR SYSTEM, AIRCRAFT EQUIPPED WITH A DIFFERENTIAL PRESSURE SENSOR SYSTEM AND METHOD FOR OPERATING A DIFFERENTIAL PRESSURE SENSOR SYSTEM

(71) Applicant: Airbus Operations GmbH, Hamburg (DE)

(72) Inventors: Ilja Waigl, Hamburg (DE); Matias Mail, Hamburg (DE); Thorsten Knijnenburg, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 141 days.

(21) Appl. No.: 15/597,223

(22) Filed: May 17, 2017

(65) Prior Publication Data

US 2017/0334573 A1 Nov. 23, 2017

(30) Foreign Application Priority Data

May 19, 2016 (EP) ..................................... 16170346

(51) Int. Cl.
*B64D 45/00* (2006.01)
*B64C 25/00* (2006.01)
(Continued)

(52) U.S. Cl.
CPC ............ *B64D 45/00* (2013.01); *B64C 25/001* (2013.01); *B64C 25/34* (2013.01); *B64D 13/02* (2013.01);
(Continued)

(58) Field of Classification Search
CPC ...... G01L 19/0618; G01L 13/00–15/00; G01L 19/0007–0046; B64D 45/00;
(Continued)

(56) References Cited

U.S. PATENT DOCUMENTS 2,396,116 A * 3/1946 Noxon ................... B64D 13/04
454/73
2,701,514 A * 2/1955 Del Mar ................ B64D 13/04
244/59
(Continued)

FOREIGN PATENT DOCUMENTS

GB 693117 A * 6/1953 ......... G01L 19/0618

OTHER PUBLICATIONS

European Search Report, Oct. 25, 2016, priority document.

*Primary Examiner* — Justin Seo
*Assistant Examiner* — David L Singer
(74) *Attorney, Agent, or Firm* — Greer, Burns & Crain, Ltd.

(57) ABSTRACT

A differential pressure sensor system for use in an aircraft comprises a differential pressure sensor for determining a differential pressure between a pressurizable aircraft cabin and an aircraft environment, the differential pressure sensor having a first port connectable to the pressurizable aircraft cabin via a first line and a second port connectable to the aircraft environment via a second line. A shut-off device of the differential pressure sensor system is arranged in the second line which is switchable between an open position in which it opens the second line, such that a pressure prevailing in the aircraft environment acts on the second port of the differential pressure sensor, and a shut-off position in which it closes the second line, such that the second port of the differential pressure sensor is shut off from the pressure prevailing in the aircraft environment.

19 Claims, 2 Drawing Sheets

(51) Int. Cl.
*B64C 25/34* (2006.01)
*B64D 13/02* (2006.01)
*G01L 13/00* (2006.01)
*G01L 19/00* (2006.01)
*B64D 13/04* (2006.01)

(52) U.S. Cl.
CPC .............. *B64D 13/04* (2013.01); *G01L 13/00* (2013.01); *G01L 19/0007* (2013.01); *B64D 2045/0085* (2013.01)

(58) Field of Classification Search
CPC .......... B64D 45/0005; B64D 13/02–04; B64D 2045/0085; B64C 1/1407–1469; B64C 25/34–36; B64C 25/001; E05B 51/023; G01M 3/3263
USPC ................................ 244/129.5–118.3; 73/706
See application file for complete search history.

(56) References Cited

U.S. PATENT DOCUMENTS

| | | | | |
|---|---|---|---|---|
| 2,983,211 | A | * | 5/1961 | Andresen, Jr. ......... B64D 13/04 454/71 |
| 3,453,945 | A | * | 7/1969 | Andresen, Jr. ......... B64D 13/02 454/71 |
| 4,164,894 | A | * | 8/1979 | Yamanaka ............. B64D 13/04 454/72 |
| 4,461,180 | A | * | 7/1984 | Hellouin de Menibus ................ G01L 19/0618 73/706 |
| 4,553,474 | A | * | 11/1985 | Wong ..................... B64D 13/04 454/71 |
| 5,220,837 | A | * | 6/1993 | Silverwater ......... G01L 19/0618 137/557 |
| 5,480,109 | A | * | 1/1996 | Klein .................... B64C 1/1407 244/129.5 |
| 2006/0006285 | A1 | | 1/2006 | Puschmann et al. |
| 2006/0252360 | A1 | * | 11/2006 | Mitchneck ............. B64D 13/04 454/74 |
| 2008/0088483 | A1 | | 4/2008 | Hellwig |
| 2008/0092630 | A1 | | 4/2008 | Piorkowski |
| 2009/0178491 | A1 | * | 7/2009 | McKitterick ............. G01W 1/00 73/861.47 |

* cited by examiner

DIFFERENTIAL PRESSURE SENSOR SYSTEM, AIRCRAFT EQUIPPED WITH A DIFFERENTIAL PRESSURE SENSOR SYSTEM AND METHOD FOR OPERATING A DIFFERENTIAL PRESSURE SENSOR SYSTEM

CROSS-REFERENCES TO RELATED APPLICATIONS

This application claims the benefit of the European patent application No. 16 170 346.7 filed on May 19, 2016, the entire disclosures of which are incorporated herein by way of reference.

BACKGROUND OF THE INVENTION

The present invention relates to a differential pressure sensor system for use in an aircraft and an aircraft equipped with a differential pressure sensor system. Furthermore, the invention relates to a method for operating a differential pressure sensor system.

Passenger aircraft which are operated at high flying attitudes are usually equipped with a pressurizable cabin which is accessible through lockable doors. In flight operation, since the atmospheric ambient pressure drops as the flying altitude increases, the pressurizable cabin ensures that an internal pressure thereof is kept essentially constant at an increased pressure level compared with the ambient pressure, i.e., the reduced atmospheric pressure at great height. In this way, the internal pressure of the pressurized cabin is largely independent of the specific flying altitude, i.e., the atmospheric ambient pressure, thereby ensuring tolerable atmospheric conditions for passengers accommodated in the pressurized cabin.

Normally, the internal pressure in the pressurized cabin is regulated by means of a cabin pressure system, as well as by the so-called flight management system of the aircraft. In general, the pressure within the pressurized cabin of the aircraft, i.e., if the aircraft is at cruising altitude, usually corresponds approximately to the atmospheric ambient pressure at a height of 2400 m (about 8000 feet). Thus, an elevated pressure, referred to as "overpressure," compared with the atmospheric ambient pressure prevails in the pressurized cabin at flying attitudes of more than 2400 m. In recent developments, in order to improve passenger comfort on board of the aircraft, the pressure within the pressurized cabin is further increased. However, when the aircraft has once again parked on the ground following the flight, the internal pressure in the pressurized cabin should once again match the atmospheric ambient pressure to ensure that the door can be safely opened. In other words, no differential pressure should exist between the pressurizable cabin and the aircraft environment.

Since an internal cabin pressure that is lower than the atmospheric ambient pressure, which is referred to as "underpressure," is very dangerous for the structure of the aircraft, aircraft equipped with pressurizable cabins usually have protection mechanisms preventing the build-up of an underpressure. However, in certain default conditions, it may be the case that, after a flight of the aircraft, a differential pressure between the pressurizable cabin and the aircraft environment still remains. Usually, this is an overpressure, but an underpressure may also occur. If the door is then unlocked and opened in this overpressure state, it flies open in an uncontrolled, quick manner, thereby posing considerable hazard to both the aircraft structure and persons who are operating the door.

For that reason, present aircraft which are equipped with a pressurizable cabin comprise a cabin differential pressure warning system or a so-called door and slides control system. These systems detect the presence of any differential pressure between the pressurizable cabin and the aircraft environment and, when the door is about to be opened, output a warning signal. Specifically, these systems output a warning signal when the differential pressure between the pressurizable cabin and the aircraft environment is greater than 2.5 mbar. The aircraft crew can then, prior to opening the door, equalize the pressure between the pressurized cabin and the aircraft environment, e.g., by venting the pressurized cabin, so that the door can be safely opened.

In present cabin differential pressure monitoring systems, for determining a differential pressure between a pressurizable aircraft cabin and an aircraft environment, a differential pressure sensor is used which is connected to both the pressurizable aircraft cabin and the aircraft environment.

SUMMARY OF THE INVENTION

The invention is directed at an objective of providing a differential pressure sensor system which has a robust design, i.e., which is less error-prone, and can be provided with lower expenses. Further, the invention is directed to an objective of providing an aircraft equipped with a differential pressure sensor system of this kind as well as a method for operating a differential pressure sensor system of this kind.

A differential pressure sensor system for use in an aircraft comprises a differential pressure sensor for determining a differential pressure between a pressurizable aircraft cabin and an aircraft environment. Hereinafter, the differential pressure between the pressurizable aircraft cabin and the aircraft environment is referred to as "cabin differential pressure."

The proposed differential pressure sensor system may be used in any aircraft which is equipped with a pressurizable aircraft cabin. Preferably, the proposed differential pressure sensor system is used in an aircraft having a cabin differential pressure warning system or a so-called doors and slides control system. Accordingly, the differential pressure sensor may be a sensor for determining a cabin differential pressure that is used in a cabin differential pressure warning system or a doors and slides control system. These systems are configured to monitor the cabin differential pressure determined by the differential pressure sensor and to output a warning signal when the cabin differential pressure exceeds a predetermined threshold value.

The differential pressure sensor has a first port and a second port and may be configured to determine a difference between the pressure acting on the first port and the pressure acting on the second port. In order to provide the thus determined differential pressure for a subsequent processing, the differential pressure sensor may further comprise an output signal line connectable the cabin differential pressure warning system or the doors and slides control system, i.e., to a processing unit thereof.

The first port of the differential pressure sensor, via a first line, is connectable to the pressurizable aircraft cabin. The second port of the differential pressure sensor, via a second line, is connectable to the aircraft environment.

The first line and the second line of the differential pressure sensor system are preferably pressure-transmitting lines. Particularly, the first line may be configured to transmit a pressure prevailing in the pressurizable aircraft cabin to the first port of the differential pressure sensor such that the pressure prevailing in the pressurizable aircraft cabin can act on the first port of the differential pressure sensor. To that end, the first line may comprise a first end connected to the differential pressure sensor and an opposed second end connected to the pressurizable aircraft cabin.

Accordingly, the second line may be configured to transmit a pressure prevailing in the aircraft environment to the second port of the differential pressure sensor such that the pressure prevailing in the pressurizable aircraft cabin can act on the second port of the differential pressure sensor. Further, a first end of the second line may be connected to the differential pressure sensor, wherein an opposed second end of the second line may be connected to the aircraft environment.

The differential pressure sensor system further comprises a shut-off device arranged in the second line. The shut-off device is switchable between an open position in which it opens the second line such that the pressure prevailing in the aircraft environment acts on the second port of the differential pressure sensor, and a shut-off position in which it closes the second line such that the second port of the differential pressure sensor is shut off from the pressure prevailing in the aircraft environment. Preferably, the shut-off device is provided in form a valve or a switch, i.e., a pneumatic switch.

Generally, in flight operation of the aircraft, i.e., if the aircraft is at cruising altitude, a differential pressure between the pressurizable aircraft cabin and the aircraft environment may be up to 700 mbar. With recent developments aiming on increasing the pressure within the pressurizable aircraft cabin during flight, this differential pressure between the pressurizable aircraft cabin and the aircraft environment even increases. Differential pressure sensors used in present aircrafts, therefore, need to withstand such a high amount of a differential pressure. As a result, present differential pressure sensors need to fulfill strict safety requirements.

According to the present invention, the function provided by a differential pressure sensor, i.e., when used in a cabin differential pressure warning system of the aircraft, is merely needed in predetermined operating modes of the aircraft. For example, in case the differential pressure sensor is used for a cabin differential warning system, its function is merely needed when the aircraft is on the ground. However, in such an operating mode of the aircraft, a substantially lower cabin differential pressure can be expected.

By providing the shut-off device, the proposed differential pressure sensor system allows the shut off of the differential pressure sensor from the pressure prevailing in the aircraft environment in a state where the function provided by the differential pressure sensor is not needed. Thereby, upon shutting off the differential pressure sensor from the pressure prevailing in the aircraft environment, the proposed differential pressure sensor system allows the prevention of the differential pressure sensor from being exposed to a high cabin differential pressure. As a result, the robustness of the differential pressure sensor system is increased. Further, since the differential pressure acting on the differential pressure sensor can be significantly reduced in the proposed differential pressure sensor system, the requirements for the differential pressure sensors can be loosened. Therefore, the expenses for providing the differential pressure sensor system can be reduced.

The differential pressure sensor system may further comprise a control unit which is configured to operate the shut-off device in dependence on an operating mode of the aircraft. Specifically, the control unit may be configured to switch the shut-off device into its open position when the aircraft is in a first operating mode and/or to switch the shut-off device into its shut-off position when the aircraft is in a second operating mode. Preferably, the first operating mode of the aircraft is an on-ground operating mode and/or the second operating mode of the aircraft is an in-flight operating mode. Generally, the on-ground operating mode of the aircraft is referred to a state where the aircraft is in ground contact, e.g., the aircraft is parked on the ground, and the in-flight operating mode of the aircraft is referred to state where the aircraft is not in ground contact.

By providing the control unit configured to switch the shut-off device in dependence on the on-ground operating mode and the in-flight operating mode of the aircraft, the differential pressure sensor system ensures that the differential pressure sensor is only exposed to a relative small amount of differential pressure while ensuring that the intended function of the differential pressure sensor, i.e., when used in a cabin differential pressure warning system, is fully provided.

In a further development, the control unit may be configured to operate the shut-off device in response to a control parameter transmitted to the control unit from a sensor device, wherein the control unit may comprise an input signal line for receiving the control parameter. The control parameter is preferably indicative of the operating mode of the aircraft. Specifically, the control parameter may be indicative of whether the aircraft is in the on-ground operating mode or in the in-flight operating mode.

In order to switch the shut-off device in dependence on the operating mode of the aircraft, i.e., whether the aircraft is in the on-ground operating mode or in the in-flight operating mode, the control parameter may be indicative of whether a landing gear of the aircraft is in ground contact. Accordingly, the control unit may be configured to switch the shut-off device into its open position when the control parameter indicates that the landing gear of the aircraft is in ground contact, and to switch the shut-off device into its shut-off position when the control parameter indicates that the landing gear of the aircraft is not in ground contact. More specifically, the control parameter may be indicative of a weight acting on the landing gear of the aircraft, wherein the control unit is configured to switch the shut-off device into its open position when the control parameter indicates that a weight acts on the landing gear, and to switch the shut-off device into its shut-off position when the control parameter indicates that no weight acts on the landing gear. Accordingly, the sensor device transmitting the control parameter to the control unit may be a pressure sensor provided in a landing gear system and configured to detect the weight acting on the landing gear.

Alternatively, the control parameter may be indicative of the pressure prevailing in the aircraft environment. Thus, the sensor device transmitting the control parameter to the control unit may be a pressure sensor configured to determine the pressure prevailing in the aircraft environment. For example, the pressure sensor may be arranged in the second line of the differential pressure sensor system between the shut-off device and the second end of the second line connecting the second line to the aircraft environment. The control unit may be configured to switch the shut-off device into its open position when the control parameter is below a threshold value, and to switch the shut-off device into its shut-off position when the control parameter exceeds the threshold value.

In a further alternative, the control parameter may be indicative of the differential pressure between the pressurizable aircraft cabin and the aircraft environment. The control unit may be configured to switch the shut-off device into its open position when the control parameter exceeds a threshold value and to switch the shut-off device in the shut-off position when the control parameter is below the threshold value.

The shut-off device of the differential pressure sensor system may be an electrically driven valve which particularly comprises a drive unit connected to a power source of the aircraft, wherein the drive unit is configured to switch the electrically driven valve between its open position and its shut-off position.

Further, the shut-off device of the differential pressure sensor system may be a mechanically driven valve, particularly a pneumatic driven valve. Specifically, the shut-off device may be a pressure limiting valve. A pressure limiting valve refers herein to a valve that can be flowed through up to a predetermined limited pressure prevailing in the second line. In other words, when the pressure prevailing in the second line exceeds the predetermined limited pressure, the valve is switched into its shut-off position. The pressure limiting valve may be provided such that the predetermined limited pressure is adjustable.

The mechanically driven valve may comprise a biasing member which is configured to bias a movable valve element of the mechanically driven valve into its closed position in order to close the second line, wherein a biasing force applied to the movable valve element by the biasing member is adjustable.

In a further development, the differential pressure sensor system may comprise a bypass line connecting the second line to a port of the shut-off device in such a manner that a pressure prevailing in the second line acts on the movable valve element so as to move the movable valve element into its open position when the pressure force acting on the movable valve element exceeds the biasing force applied to the movable valve element by the biasing member, and to allow the movement of the movable valve element into its closed position when the pressure force acting on the movable valve element is below the biasing force applied to the movable valve element by the biasing member. In this configuration, the function of the control unit may be allocated to the biasing member.

Providing a mechanically driven valve, particularly a pressure limiting valve, has the effect that the shut-off device can be operated in a self-contained manner. In other words, the shut-off device does not need to be connected to other components of the system such as a power source or an electronic control unit to ensure its functionality, thereby providing a simple and less complex structure of the differential pressure sensor system.

In a further development, the second port of the differential pressure system may be connectable to the pressurizable aircraft cabin via a third line, wherein the shut-off device, in its shut-off position, is configured to connect the second port of the differential pressure sensor to the pressurizable aircraft cabin via the third line, such that the pressure prevailing in the aircraft environment acts on the second port of the differential pressure sensor. In other words, the shut-off device thus enables that, in its shut-off position, the pressure prevailing in the pressurizable aircraft cabin acts on both the first and the second port of the differential pressure sensor. This has the effect that the shut-off device in its shut-off position can prevent the differential pressure sensor from being exposed to any differential pressure, particularly a negative differential pressure where the pressure acting on the second port is greater than the pressure acting on the first port of the differential pressure sensor. Thereby, the durability of the differential pressure sensor system can be improved.

Specifically, the shut-off device may be a 3-way valve, i.e., 3/2-way valve, having three ports, wherein a first port connected to the differential pressure sensor can either be connected to, in its open position, a second port connected to the aircraft environment or, in its shut-off position, a third port connected to the pressurizable aircraft cabin.

In order to further improve the reliability of the differential pressure sensor system, the control unit or, in case the mechanically driven valve is provided, the biasing member of the mechanically driven valve may be configured to switch, in a default condition, the shut-off device into its open position. The default condition may be a default condition of any one of the components provided in the differential pressure sensor system or of the differential pressure sensor system itself. In this way, the differential pressure sensor system enables the monitoring of the differential pressure between the pressurizable aircraft cabin and the aircraft environment even when a default condition occurs.

An aircraft is equipped with the above-described differential pressure sensor system.

A method for operating a differential pressure sensor system with a differential pressure sensor for determining a differential pressure between the pressurizable aircraft cabin and an aircraft environment, wherein the differential pressure sensor has a first port connectable to the pressurizable aircraft cabin via a first line and a second port connectable to the aircraft environment via a second line, comprises the step of switching a shut-off device arranged in the second line between an open position in which it opens the second line such that the pressure prevailing the aircraft environment acts on the second port of the differential pressure sensor, and a shut-off position in which it closes the second line such that the second port of the differential pressure sensor is shut off from the pressure prevailing in the aircraft environment.

BRIEF DESCRIPTION OF THE DRAWINGS

Preferred embodiments of the invention will now be explained in greater detail with reference to the accompanying schematic drawings, in which.

DETAILED DESCRIPTION OF THE PREFERRED EMBODIMENTS

Figure 1:
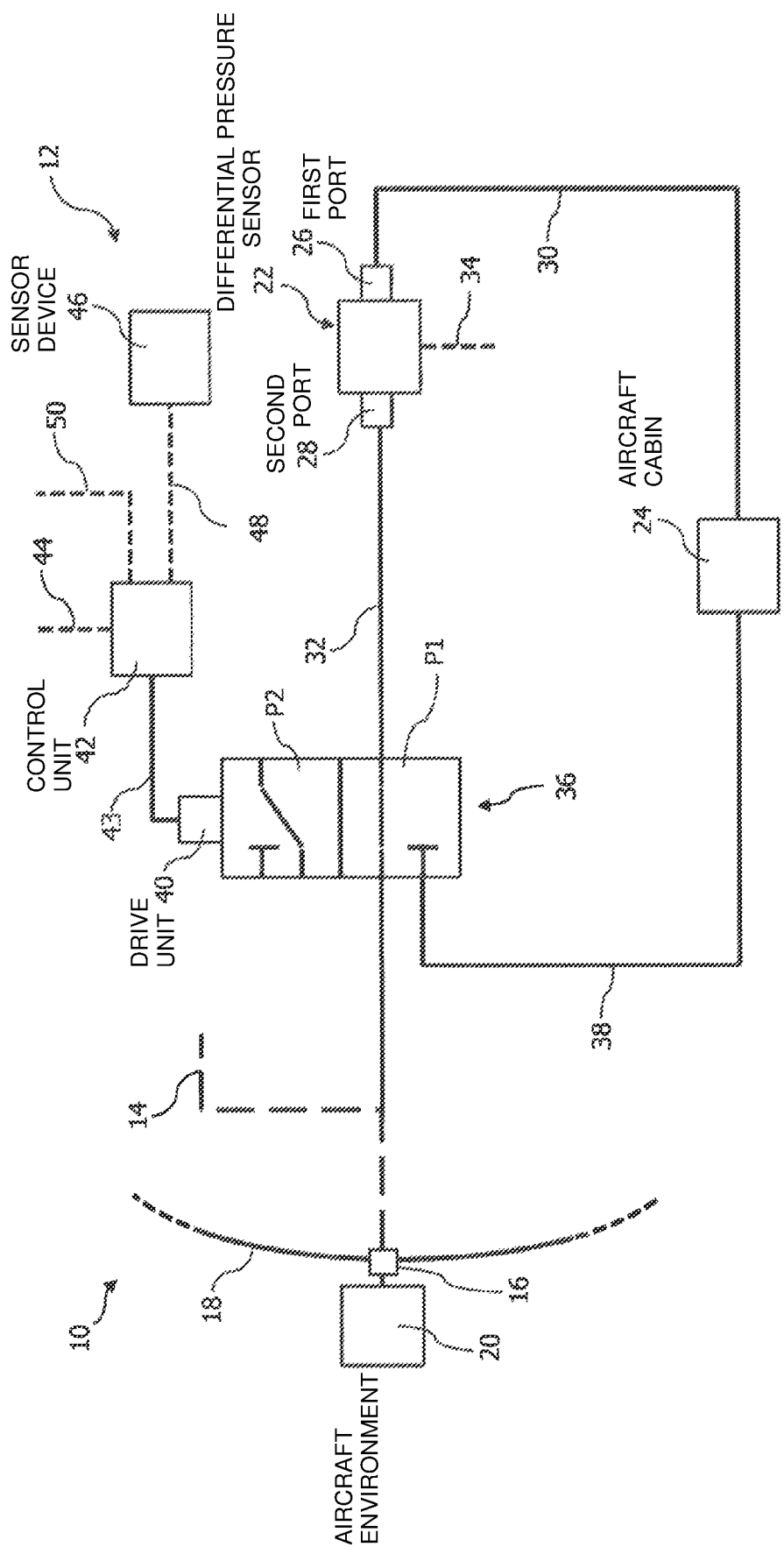
FIG. 1 shows a first embodiment of a differential pressure sensor system installed in an aircraft.

FIG. 1 depicts a schematic drawing of an area of an aircraft 10 in which a differential pressure sensor system 12 is installed. The aircraft 10 comprises a piping system 14 with an outside port 16 provided in an outer skin 18 of the aircraft 10, wherein the piping system 14 is connected to an aircraft environment 20 via the outside port 16.

The differential pressure sensor system 12 comprises a differential pressure sensor 22 for determining a differential pressure between a pressurizable aircraft cabin 24 of the aircraft 10 and the aircraft environment 20. The differential pressure sensor 22 may be used for a cabin differential pressure warning system or for any other system of the aircraft 10 which monitors a differential pressure between the pressurizable aircraft cabin 24 and the aircraft environment 20.

The differential pressure sensor 22 has a first port 26 and a second port 28. The first port 26 is connected to the pressurizable aircraft cabin 24 via a first line 30, a first end of which is connected to the first port 26 of the differential pressure sensor 22 and an opposed second end of which is connected to the pressurizable aircraft cabin 24. The second port 28 of the differential pressure sensor 22 is connected to a second line 32, via which the second port 28 is connectable to the aircraft environment 20. A first end of the second line 32 is connected to the second port 28 and an opposed second end of the second line 32, via the piping system 14, is connected to the aircraft environment 20. The first line 30 is configured to transmit a pressure prevailing in the pressurizable aircraft cabin 24 to the first port 26 of the differential pressure sensor 22 such that the pressure prevailing in the pressurizable aircraft cabin 24 can act on the first port 26 of the differential pressure sensor 22. Accordingly, the second line 32 is configured to transmit the pressure prevailing in the aircraft environment 20 such that the pressure prevailing in the aircraft environment 20 can act on the second port 28 of the differential pressure sensor 22. In this way, the differential pressure sensor 22 is configured to determine the differential pressure between the pressurizable aircraft cabin 24 and the aircraft environment 20 in dependence on the pressure acting on the first port 26 and the pressure acting on the second port 28.

For transmitting the thus determined differential pressure, e.g., to a cabin differential pressure warning system, the differential pressure sensor 22 comprises an output signal line 34. Preferably, the differential pressure sensor 22 is configured such that, in case the differential pressure determined by the differential pressure sensor 22 exceeds a predetermined threshold value, a warning signal is transmitted via the output signal line 34, e.g., to the cabin differential pressure warning system.

The differential pressure sensor system 12 further comprises a shut-off device 36 which is provided in form of a pneumatic switch. The shut-off device 36 is arranged in the second line 32 and is switchable between an open position P1 in which it opens the second line 32 such that the pressure prevailing in the aircraft environment 20 acts on the second port 28 of the differential pressure sensor 22, and a shut-off position P2 in which it closes the second line 32 such that the second port 28 of the differential pressure sensor 22 is shut off from the pressure prevailing in the aircraft environment 22. Specifically, the shut-off device 36 is provided in form of an electrically driven 3-way valve which is configured, in its shut-off position P2, to connect the second port 28 of the differential pressure sensor 22 to the pressurizable aircraft cabin 24 via a third line 38. Particularly, when the shut-off device 36 is switched into its shut-off position P2, the second port 28 of the differential pressure sensor 22, via a section of the second line 32 disposed between the shut-off device 36 and the differential pressure sensor 22, is connected to the third line 38. In this state, the pressure prevailing in the pressurizable aircraft cabin 24, via the third line 38 and the section of the second line 32, acts on the second port 28 of the differential pressure sensor 22. When the shut-off device 36 is switched into its open position P1, the second port 28 of the differential pressure sensor 22 is disconnected from the third line 38. In other words, the shut-off device 36 provided in form of the 3-way valve has three ports, wherein a first port of the shut-off device 36 connected to the differential pressure sensor 22 can either be connected to, in its open position, a second port of the shut-off device 36 which is connected to the aircraft environment 20 or, in its shut-off position, a third port of the shut-off device 36 which is connected to the pressurizable aircraft cabin 24. The shut-off device 36 comprises a drive unit 40 for switching the shut-off device 36 between the open position P1 and the shut-off position P2.

The differential pressure sensor system 12 further comprises a control unit 42 which is configured to operate the shut-off device 36 in dependence on an operating mode of the aircraft 10. The control unit 42 is connected to the drive unit 40 of the shut-off device 36 via a control line 43 and configured to operate the drive unit 40 in order to switch the shut-off device 36 between its open position P1 and its shut-off position P2. The control unit 42 is connected to a power line 44 connecting the control unit 42 to a power source of the aircraft 10. Further, the control unit 42 is connected to a sensor device 46 via an input signal line 48 which transmits control parameters from the sensor device 46 to the control unit 42. Still further, the control unit 42 is connected to an output signal line 50 for transmitting monitoring signals, e.g., to the cabin differential pressure warning system.

The control unit is configured to operate the shut-off device 36 in response to a control parameter transmitted to the control unit 42 from the sensor device 46 via the signal input line 48, wherein the control parameter is indicative of an operating mode of the aircraft 10.

Preferably, the control parameter is indicative of whether a landing gear of the aircraft 10 is in ground contact, wherein the control unit 42 is configured to switch the shut-off device 36 into its open position P1 when the control parameter indicates that the landing gear of the aircraft 10 is in ground contact, and to switch the shut-off device 36 into its shut-off position P2 when the control parameter indicates that the landing gear of the aircraft 10 is not in ground contact. Specifically, the control parameter is indicative of a weight acting on the landing gear of the aircraft 10, wherein the control unit 42 is configured to switch the shut-off device 36 into its open position P1 when the control parameter indicates that a weight acts on the landing gear, and to switch the shut-off device 36 into its shut-off position P2 when the control parameter indicates that no weight acts on the landing gear.

Alternatively, the control parameter may be indicative of the pressure prevailing in the aircraft environment 20, wherein the control unit 42 may be configured to switch the shut-off device 36 into its open position P1 when the control parameter is below a threshold value and to switch the shut-off device 36 into its shut-off position P2 when the control parameter exceeds the threshold value.

Still alternatively, the control parameter may be indicative of the differential pressure between the pressurizable aircraft cabin 24 and the aircraft environment 20, wherein the control unit 42 may be configured to switch the shut-off device 36 into its open position P1 when the control parameter exceeds a threshold value and to switch the shut-off device 36 into its shut-off position when the control parameter is below the threshold value.

Figure 2:
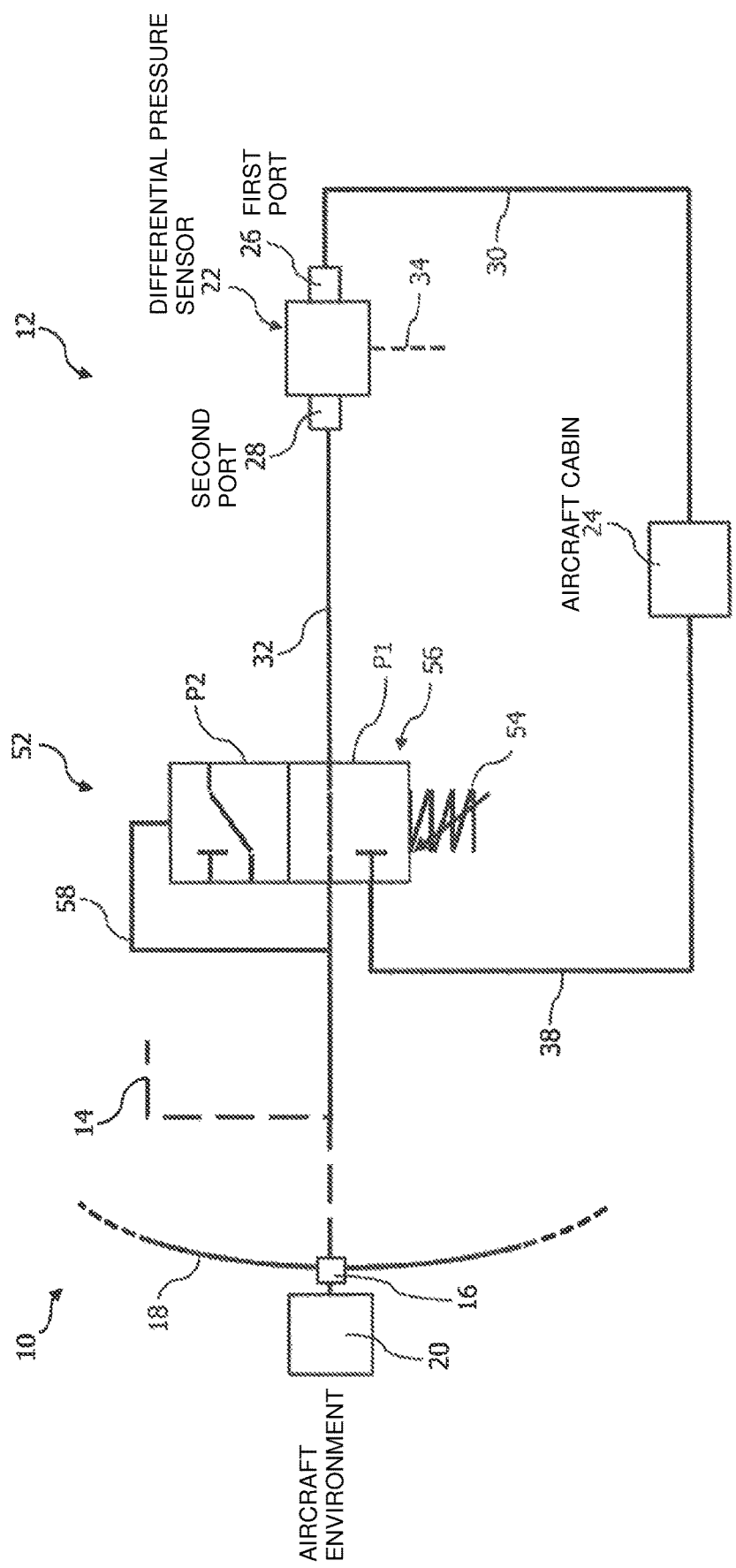
FIG. 2 shows a second embodiment of the differential pressure sensor system installed in an aircraft.

FIG. 2 shows a further embodiment of a differential pressure sensor system 12 installed in the aircraft 10. In this embodiment, compared to the differential pressure sensor system depicted in FIG. 1, the shut-off device is provided in form of a mechanically driven valve 52, particularly a 3-way pneumatic pressure limiting valve. The mechanically driven valve 52 comprises a biasing member 54 which is configured to bias a movable valve element 56 into its closed position P2 in order to close the second line 32. In other words, the biasing member 54 applies a biasing force to the movable valve element 56. The mechanically driven valve 52 is provided such that the biasing force applied to the movable valve element 56 by the biasing member 54 is adjustable.

The differential pressure sensor system 12 further comprises a biasing line 58 connecting the second line 32 to a port of the mechanically driven valve 52 in such a manner that a pressure prevailing in the second line 32 acts on the movable valve element 56 so as to move the movable valve element 56 into its open position P1 when a pressure force acting on the movable valve element 56 exceeds the biasing force applied to the movable valve element 56 by the biasing member 54, and to allow a movement of the movable valve element 56 into its closed position P2 when the pressure force acting on the movable valve element 56 is below the biasing force applied to the movable valve element 56 by the biasing member 54. In this configuration, the biasing member 54 functions as a control unit configured to operate the mechanically driven valve 52 in dependence on the pressure prevailing in the aircraft environment which is indicative of an operational mode of the aircraft 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A differential pressure sensor system for use in an aircraft comprising:
a differential pressure sensor configured to determine a differential pressure between a pressurizable aircraft cabin and an aircraft environment, the differential pressure sensor having a first port connectable to the pressurizable aircraft cabin via a first line and a second port connectable to the aircraft environment via a second line; and
a shut-off device arranged in the second line configured to be switchable between an open position in which it opens the second line such that a pressure prevailing in the aircraft environment acts on the second port of the differential pressure sensor, and a shut-off position in which the shut-off device closes the second line such that the second port of the differential pressure sensor is shut off from the pressure prevailing in the aircraft environment.

2. The differential pressure sensor system of claim 1, further comprising a control unit configured to operate the shut-off device in dependence on an operating mode of the aircraft.

3. The differential pressure sensor system of claim 2, wherein the control unit is configured to at least one of switch the shut-off device into its open position when the aircraft is in a first operating mode, or to switch the shut-off device into its shut-off position when the aircraft is in a second operating mode.

4. The differential pressure sensor system of claim 3, wherein the first operating mode is an on-ground operating mode.

5. The differential pressure sensor system of claim 3, wherein the second operating mode is an in-flight operating mode.

6. The differential pressure sensor system of claim 5, wherein the control parameter is indicative of a weight acting on the landing gear of the aircraft, and wherein the control unit is configured to switch the shut-off device into its open position when the control parameter indicates that a weight acts on the landing gear, and to switch the shut-off device into its shut-off position when the control parameter indicates that no weight acts on the landing gear.

7. The differential pressure sensor system of claim 2, wherein the control unit is configured to operate the shut-off device in response to a control parameter transmitted to the control unit from a sensor device, the control parameter being indicative of the operating mode of the aircraft.

8. The differential pressure sensor system of claim 7, wherein the control parameter is indicative of whether a landing gear of the aircraft is in ground contact, and wherein the control unit is configured to switch the shut-off device into its open position when the control parameter indicates that the landing gear of the aircraft is in ground contact, and to switch the shut-off device into its shut-off position when the control parameter indicates that the landing gear of the aircraft is not in ground contact.

9. The differential pressure sensor system of claim 7, wherein the control parameter is indicative of the pressure prevailing in the aircraft environment, and the control unit is configured to switch the shut-off device into its open position when the control parameter is below a threshold value and to switch the shut-off device into its shut-off position when the control parameter exceeds the threshold value.

10. The differential pressure sensor system of claim 7, wherein the control parameter is indicative of the differential pressure between the pressurizable aircraft cabin and the aircraft environment, and wherein the control unit is configured to switch the shut-off device into its open position when the control parameter exceeds a threshold value and to switch the shut-off device into its shut-off position when the control parameter is below the threshold value.

11. The differential pressure sensor system of claim 1, wherein the shut-off device is an electrically driven valve.

12. The differential pressure sensor system of claim 1, wherein the shut-off device is a mechanically driven valve and comprises a biasing member configured to bias a movable valve element of the mechanically driven valve into its closed position to close the second line, wherein a biasing force applied to the movable valve element by the biasing member is adjustable.

13. The differential pressure sensor system of claim 12, wherein the mechanically driven valve is a pneumatic pressure limiting valve.

14. The differential pressure sensor system of claim 13, further comprising a bypass line connecting the second line to a port of the shut-off device in such a manner that a pressure prevailing in the second line acts on the movable valve element so as to move the movable valve element into its open position when the pressure force acting on the movable valve element exceeds the biasing force applied to the movable valve element by the biasing member, and to allow a movement of the movable valve element into its closed position when the pressure force acting on the movable valve element is below the biasing force applied to the movable valve element by the biasing member.

15. The differential pressure sensor system of claim 1, wherein the second port of the differential pressure sensor is connectable to the pressurizable aircraft cabin via a third line, and the shut-off device, in its shut-off position, is configured to connect the second port of the differential pressure sensor to the third line such that the pressure prevailing in the aircraft environment acts on the second port of the differential pressure sensor.

16. The differential pressure sensor system of claim 15, wherein the shut-off device is a 3-way valve.

17. The differential pressure sensor system of claim 1, wherein the control unit is configured to switch, in a default condition, the shut-off device into its open position.

18. An aircraft equipped with a differential pressure sensor system according to claim 1.

19. A method for operating a differential pressure sensor system with a differential pressure sensor for determining a differential pressure between a pressurizable aircraft cabin and an aircraft environment, the differential pressure sensor having a first port connectable to the pressurizable aircraft cabin via a first line and a second port connectable to the aircraft environment via a second line, wherein the method comprises the steps:

switching a shut-off device arranged in the second line in an open position in which the shut-off device opens the second line such that a pressure prevailing in the aircraft environment acts on the second port of the differential pressure sensor; and alternately switching the shut-off device in a shut-off position in which the shut-off device closes the second line such that the second port of the differential pressure sensor is shut off from the pressure prevailing in the aircraft environment.

\* \* \* \* \*